(12) United States Patent
Qiao (10) Patent No.: US 11,100,037 B2
(45) Date of Patent: Aug. 24, 2021

(54) EXTENDED STORAGE DEVICE BASED ON PCIE BUS

(71) Applicant: HANGZHOU HIKVISION DIGITAL TECHNOLOGY CO., LTD., Hangzhou (CN)

(72) Inventor: Hui Qiao, Hangzhou (CN)

(73) Assignee: HANGZHOU HIKVISION DIGITAL TECHNOLOGY CO., LTD., Hangzhou (CN)

(*) Notice: Subject to any disclaimer, the term of this patent is extended or adjusted under 35 U.S.C. 154(b) by 0 days.

(21) Appl. No.: 16/613,495

(22) PCT Filed: Oct. 19, 2017

(86) PCT No.: PCT/CN2017/106789
§ 371 (c)(1),
(2) Date: Nov. 14, 2019

(87) PCT Pub. No.: WO2018/209889
PCT Pub. Date: Nov. 22, 2018

(65) Prior Publication Data
US 2020/0364175 A1    Nov. 19, 2020

(30) Foreign Application Priority Data
May 16, 2017    (CN) .......................... 201710344155.0

(51) Int. Cl.
*G06F 13/42* (2006.01)
*G06F 9/4401* (2018.01)
(Continued)

(52) U.S. Cl.
CPC ........ *G06F 13/4221* (2013.01); *G06F 9/4406* (2013.01); *G06F 9/4812* (2013.01);
(Continued)

(58) Field of Classification Search
CPC .. G06F 13/4221; G06F 13/4059; G06F 13/24; G06F 2213/0026; G06F 11/0772; G06F 11/3034
See application file for complete search history.

(56) References Cited

U.S. PATENT DOCUMENTS

| 10,028,018 B1* | 7/2018 | Martel ..................... H04N 7/18 |
| 2008/0162811 A1 | 7/2008 | Steinmetz et al. |

(Continued)

FOREIGN PATENT DOCUMENTS

| CN | 205193779 | 4/1916 |
| CN | 106060462 | 10/1916 |

(Continued)

OTHER PUBLICATIONS

International Search Report and Written Opinion issued in corresponding application No. PCT/CN2017/106789, dated Feb. 14, 2018.

(Continued)

*Primary Examiner* — Glenn A. Auve
(74) *Attorney, Agent, or Firm* — Norton Rose Fulbright US LLP (57) ABSTRACT

An extended storage device based on a PCIe bus is provided. The extended storage device includes: a video processing device and a RAID card. The video processing device is connected to the RAID card via a PCIe bus; and the RAID card is constructed by an embedded system on chip (SoC). The video processing device may be connected to the RAID card via the PCIe bus, and virtual hard disk nodes corresponding to respective physical hard disk nodes of the RAID card may be built at the video processing device, so that the video processing device may manage physical hard disk nodes of the RAID card as managing a local hard disk, and then may organize these virtual hard disk nodes into a virtual RAID node, while the complex RAID computing is actually (Continued)

achieved through the SOC of the RAID card without occupying resources of CPU of the video processing device, so that a normal operation of business of the video processing device can be ensured.

12 Claims, 5 Drawing Sheets

(51) Int. Cl.
*G06F 9/48* (2006.01)
*G06F 11/07* (2006.01)
*G06F 11/30* (2006.01)
*G06F 13/24* (2006.01)
*G06F 13/40* (2006.01)

(52) U.S. Cl.
CPC ...... *G06F 11/0772* (2013.01); *G06F 11/3034* (2013.01); *G06F 13/24* (2013.01); *G06F 13/4059* (2013.01); *G06F 2213/0026* (2013.01)

(56) References Cited

U.S. PATENT DOCUMENTS

| | | | |
|---|---|---|---|
| 2010/0274926 A1 | 10/2010 | Marulkar | |
| 2012/0114314 A1* | 5/2012 | Pashkevich | H04N 21/2747 386/328 |
| 2012/0166909 A1 | 6/2012 | Schmisseur et al. | |
| 2012/0239849 A1 | 9/2012 | Brahmaroutu et al. | |
| 2013/0067188 A1* | 3/2013 | Mehra | G06F 3/0689 711/170 |
| 2013/0290608 A1* | 10/2013 | Nelogal | G06F 3/0688 711/103 |
| 2015/0331765 A1 | 11/2015 | Madhusudana et al. | |
| 2017/0102952 A1 | 4/2017 | Khemani et al. | |

FOREIGN PATENT DOCUMENTS

| | | |
|---|---|---|
| CN | 102902650 | 1/2013 |
| CN | 103440212 | 12/2013 |
| CN | 104391761 | 3/2015 |
| CN | 104615577 | 5/2015 |
| CN | 105094687 | 11/2015 |
| CN | 105138494 | 12/2015 |
| WO | WO 2018209889 | 11/1918 |

OTHER PUBLICATIONS

Office Action issued in corresponding Chinese Application No. 201710344155.0, dated Mar. 19, 2020 (English machine translation provided).
*Comparison of RAID Types: Software vs. True Hardware RAID.* Silicon Image, dated Jun. 2009, pp. 1-8.
Extended European Search Report Issued in Corresponding European Application No. 17910222.3, dated Jan. 29, 2020.
*MegaRaid SAS Software User Guide.* LSI, Jun. 2010, 330 pages.
Beeler, Brian. "LSI MegaRAID 9265-8i Review: Our First Look" *StorageReview*, Mar. 17, 2011, https://www.storagereview.com/review/lsj-megaraid-9265-8i-review-our-first-look. Accessed Feb. 3, 2021.
Office Action issued in Corresponding European Application No. 17910222.3, dated Feb. 10, 2021.

* cited by examiner

EXTENDED STORAGE DEVICE BASED ON PCIE BUS

The present application claims the priority to a Chinese patent application No. 201710344155.0 filed with the China National Intellectual Property Administration on May 16, 2017 and entitled "Extended storage device based on PCIe Bus", which is incorporated herein by reference in its entirety.

TECHNICAL FIELD

The present application relates to the field of data storage technology, and in particular to an extended storage device based on a PCIe bus.

BACKGROUND

In the field of security monitoring, monitoring devices can collect a large number of monitoring videos. Therefore, how to store and analyze monitoring videos effectively becomes an important issue.

RAID (redundant array of independent disks) is a method of storing the same data in different places of multiple hard disks. By storing data in multiple hard disks, input and output operations can be overlapped in a balanced manner to improve performance. Since multiple hard disks increase storage capacity and mean interval between failures, and storage data redundant also increases fault tolerance.

Based on characteristics of RAID, in the current security monitoring field, data storage based on RAID has become the main way to store monitoring videos. Specifically, multiple hard disks under main controller of video processing device may be organized directly. RAID algorithm, hard disk management, data storage and other operations may be performed by the main controller CPU of the video processing device. However, the RAID algorithm needs to consume computing resources of the main controller CPU, which competes with original processing procedures for security monitoring, such as audio processing, video processing, encoding, decoding, display and the like, so that normal operations of these core functions are affected, and circumstance such as losing video frames, GUI (Graphical User Interface) lag, etc. may be occurred.

SUMMARY

The purpose of the embodiment of the present application is to provide an extended storage device based on a PCIe bus, to reduce computing resources of a main controller CPU of a video processing device and to ensure its normal operation of business. Specifically, the technical solutions are as follows.

An embodiment of the present application provides an extended storage device based on a peripheral component interconnect express (PCIe) bus, the device includes: a video processing device, a RAID card; the video processing device is connected to the RAID card via a PCIe bus; the RAID card is constructed by an embedded system on chip (SoC); the RAID card is attached with multiple physical hard disks.

A PCIe bus shared buffer between the video processing device and the RAID card is divided according to storage protocols of both parties to constitute a virtual-real protocol interaction area for communication between a virtual node and an entity node of the both parties;

The RAID card is configured for detecting a physical hard disk attached to the RAID card, registering a physical hard disk node according to a storage protocol of the RAID card, and sending a registration request to the video processing device;

The video processing device is configured for receiving the registration request, registering a corresponding virtual hard disk node according to the registration request, and applying for a virtual-real protocol channel in the virtual-real protocol interaction area.

The video processing device is further configured for sending hard disk structured information to the RAID card through the virtual hard disk node, the virtual-real protocol channel, and the physical hard disk node according to a RAID building command from a business layer;

The RAID card is further configured for receiving the hard disk structured information through the physical hard disk node and writing the hard disk structured information into each physical hard disk;

The video processing device is further configured for creating a virtual RAID node according to the RAID building command from the business layer and sending a RAID construction request to the RAID card;

The RAID card is further configured for receiving the RAID construction request and creating an entity RAID node according to the RAID construction request;

The video processing device is further configured for sending business data to the entity RAID node of the RAID card through the virtual RAID node and the virtual-real protocol channel;

The RAID card is further configured for receiving the business data through the entity RAID node and writing the business data into each physical hard disk after performing data splitting and RAID computing on the business data.

Optionally, the virtual-real protocol interaction area includes: a PCIe command area, a SCSI I/O parameter area, a SCSI I/O data area, a Block I/O parameter area, and a Block I/O data area.

Data communication between the virtual hard disk node of the video processing device and the physical hard disk node of the RAID card is achieved through a channel applied for in the SCSI I/O parameter area and the SCSI I/O data area.

Data communication between the virtual RAID node of the video processing device and the entity RAID node of the RAID card is achieved through a channel applied for in the Block I/O parameter area and the Block I/O data area;

Command interaction between the video processing device and the RAID card is achieved through the PCIe command area.

Optionally, the video processing device is further configured for, when its operating system is started, scanning the RAID card via the PCIe bus, determining a start-up address and an address mapping of the RAID card, loading an embedded Linux minimum system required for starting the RAID card into the start-up address of the RAID card, and resetting the RAID card;

The RAID card is further configured for running the embedded Linux minimum system after completing the reset;

The video processing device is further configured for registering an interrupt and building a servo process;

The RAID card is further configured for registering an interrupt and building a servo process;

Optionally, the RAID card is specifically configured for, after registering the interrupt and building the servo process, initializing a SATA controller of the RAID card, registering a physical hard disk node according to the storage protocol of the RAID card after detecting a physical hard disk attached to the RAID card, sending the registration request to the video processing device through the PCIe command area, and sending the interrupt to notify the video processing device;

The video processing device is specifically configured for receiving the registration request sent by the RAID card by receiving the interrupt and initiating the servo process, and registering a corresponding virtual hard disk node according to the registration request.

Optionally, the video processing device is further configured for applying for a SCSI I/O data channel and a SCSI I/O parameter channel in the SCSI I/O data area and the SCSI I/O parameter area after registering the corresponding virtual hard disk node.

The video processing device is specifically configured for sending the hard disk structured information to the RAID card through the virtual hard disk node, the SCSI I/O data channel and SCSI I/O parameter channel, and the physical hard disk node, and sending the interrupt to notify the RAID card;

The RAID card is specifically configured for receiving the hard disk structured information by receiving the interrupt and initiating the servo process, and writing the hard disk structured information into each physical hard disk.

Optionally, the video processing device is specifically configured for sending the RAID construction request to the RAID card through the PCIe command area, and sending the interrupt to notify the RAID card;

The RAID card is specifically configured for receiving the RAID construction request by receiving the interrupt and initiating the servo process, and creating an entity RAID node according to the RAID construction request;

Optionally, the video processing device is further configured for applying for a Block I/O parameter channel and a Block I/O data channel in the Block I/O data area and the Block I/O parameter area after creating the virtual RAID node.

The video processing device is specifically configured for receiving a data storage request from the business layer, writing business data to be stored into the Block I/O parameter channel and Block I/O data channel, and sending the interrupt to notify the RAID card;

The RAID card is specifically configured for receiving the business data from the Block I/O parameter channel and the Block I/O data channel by receiving the interrupt and initiating the servo process, performing the data splitting and RAID computing, and writing concurrent data obtained after the computing into each physical hard disk.

Optionally, the RAID card is further configured for receiving a SCSI I/O command result sent by each physical hard disk, and sending the SCSI I/O command result to the virtual RAID node of the video processing device.

Optionally, the RAID card is further configured for sending abnormal state information to the video processing device when detecting an abnormality of a physical hard disk;

The video processing device is further configured for receiving the abnormal state information, determining a corresponding abnormality handling policy, and sending the abnormality handling policy to the RAID card;

The RAID card is further configured for receiving the abnormality handling policy, and handling the abnormality according to the abnormality handling policy.

Optionally, the RAID card is specifically configured for sending the abnormal state information to the video processing device through the SCSI I/O data channel and SCSI I/O parameter channel when detecting the abnormality of the physical hard disk.

Optionally, the abnormality handling policy includes: a physical hard disk layer abnormality handling policy, a Block layer abnormality handling policy and a RAID management layer abnormality handling policy;

The video processing device is specifically configured for sending the physical hard disk layer abnormality handling policy to the RAID card through the SCSI I/O data channel and the SCSI I/O parameter channel, sending the Block layer abnormality handling policy to the RAID card through the Block I/O data channel and the Block I/O parameter channel, and sending the RAID management layer abnormality handling policy to the RAID card through the PCIe command area.

Optionally, the video processing device is specifically configured for receiving the abnormal state information by receiving the interrupt and initiating the servo process.

The RAID card is specifically configured for receiving the abnormality handling policy by receiving the interrupt and initiating the servo process.

The embodiment of the present application provides an extended storage device based on a PCIe bus, the extended storage device includes: a video processing device and a RAID card; the video processing device is connected to the RAID card via a PCIe bus; the RAID card is constructed by an embedded system on chip (SoC). The RAID card is connected with multiple physical hard disks. A PCIe bus shared buffer between the video processing device and the RAID card is divided according to storage protocols of both parties to constitute a virtual-real protocol interaction area for communication between a virtual node and an entity node of the both parties. The RAID card is configured for detecting a physical hard disk attached to the RAID card, registering a physical hard disk node according to a storage protocol of the RAID card, and sending a registration request to the video processing device. The video processing device is configured for receiving the registration request, registering a corresponding virtual hard disk node according to the registration request, and applying for a virtual-real protocol channel in the virtual-real protocol interaction area. The video processing device is further configured for sending hard disk structured information to the RAID card through the virtual hard disk node, the virtual-real protocol channel, and the physical hard disk node according to a RAID building command from a business layer. The RAID card is further configured for receiving the hard disk structured information through the physical hard disk node and writing the hard disk structured information into each physical hard disk. The video processing device is further configured for creating a virtual RAID node according to the RAID building command from the business layer and sending a RAID construction request to the RAID card. The RAID card is further configured for receiving the RAID construction request and creating an entity RAID node according to the RAID construction request. The video processing device is further configured for sending business data to the entity RAID node of the RAID card through the virtual RAID node and the virtual-real protocol channel. The RAID card is further configured for receiving the business data through the entity RAID node and writing the business data into each physical hard disk after performing data splitting and RAID computing on the business data.

In the embodiment of the present application, the video processing device may be connected to the RAID card via the PCIe bus, and virtual hard disk nodes corresponding to respective physical hard disk nodes of the RAID card may be built at the video processing device, so that the video processing device may manage physical hard disk nodes of the RAID card as managing a local hard disk, while a complex RAID computing is actually achieved through the RAID card without occupying resources of CPU of the video processing device, so that a normal operation of business of the video processing device can be ensured.

BRIEF DESCRIPTION OF THE DRAWINGS

In order to more clearly describe the technical solution of the embodiments of the application and the prior art, drawings needed in the embodiments and the prior art will be briefly described below. Obviously, the drawings described below are for only some embodiments of the present application, one of ordinary skills in the art can also obtain other drawings based on these drawings without any creative efforts.

DETAILED DESCRIPTION

In order to reduce computing resources of a main controller CPU of a video processing device and to ensure its normal operation of business, an embodiment of the present application provides an extended storage device based on PCIe bus.

The technical solution of the application will be described in detail with reference to the drawings of embodiments of the present application. Obviously, the embodiments described are only some instead of all of the embodiments of the present application. All other embodiments obtained by those of ordinary skills in the art based on the embodiments herein without any creative efforts are within the scope of the present application.

It should be noted that embodiments in the present application and features in the embodiments may be combined with each other without conflict. The present application will be described in detail below with reference to the accompanying drawings.

In an embodiment of the present application, in order to reduce computing resources of a main controller CPU of a video processing device and to ensure its normal operation of business, the video processing device may be connected to the RAID card via a PCIe bus, wherein, the above video processing device may be an embedded NVR (Network Video Recorder) or a DVR (Digital Video Recorder).

PCIe (that is PCI-Express, Peripheral Component Interconnect-Express) is a universal bus. PCIe employs a serial interconnection mode to transmit data in a point-to-point form. Each device may use a bandwidth separately, which greatly increases a transmission rate and also creates conditions for higher frequency.

Figure 1:
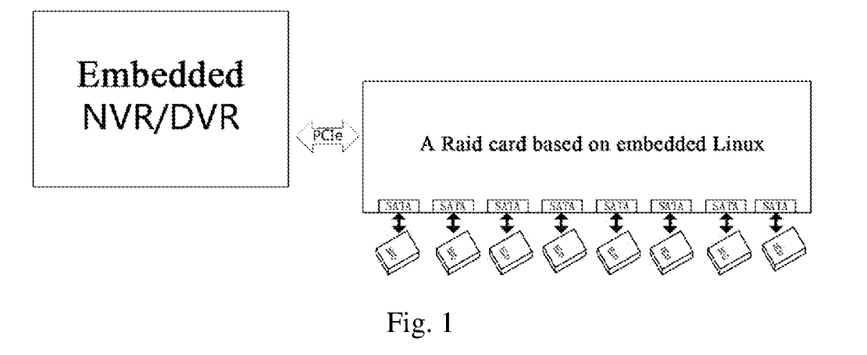
FIG. 1 is a schematic structural view of an extended storage device based on a PCIe bus according to an embodiment of the present application.

For example, as shown in FIG. 1, the RAID card may be connected to an embedded NVR/DVR in a PCIe bus mode to obtain the extended storage device of the present embodiment. The embedded NVR/DVR is at a RC (Root Complex) end of the PCIe and the RAID card is at an EP (End Point) end. The main controller at the RC end is a dedicated Soc (System on Chip) for the embedded NVR/DVR, and the EP end may flexibly select a universal Soc according to the number of attached physical hard disks and the CPU computing power required for a total storage bandwidth, and an embedded Linux system may be running at the EP end.

Thereby, traditional security businesses (audio, video processing) may be performed on the main controller of the embedded NVR/DVR; and data storage (video recording, sound recording, etc.) may be performed on the RAID card. Multiple hard disk interfaces, the number of which is defined by product specifications, may be extended by SATA (Serial Advanced Technology Attachment) controller and corresponding physical hard disks may be attached by SATA at the RAID card.

Figure 2:
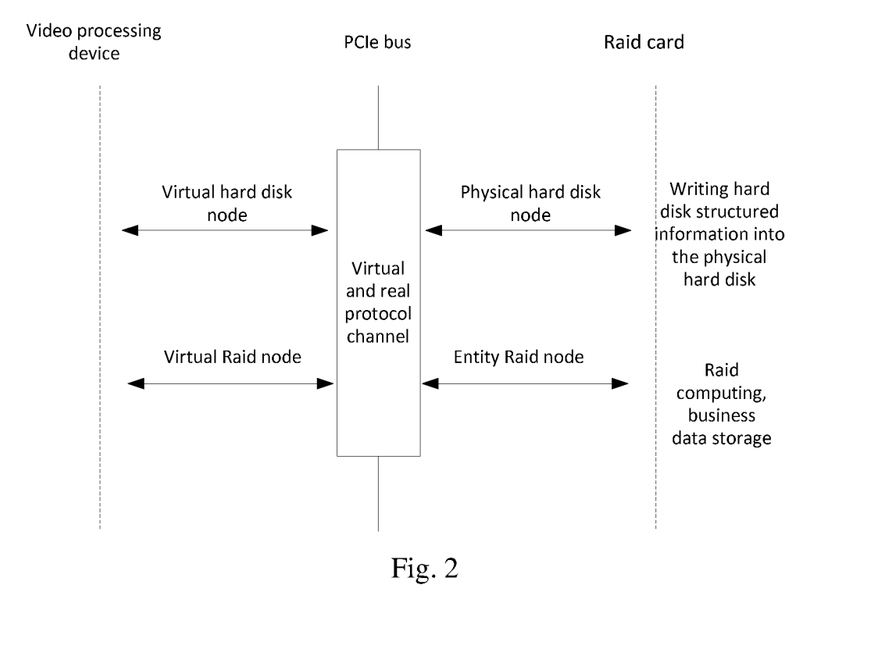
FIG. 2 is a basic flow diagram of data communication according to an embodiment of the present application.

Specifically, as shown in FIG. 2, FIG. 2 shows a basic flow diagram of data communication according to an embodiment of the present application. The PCIe bus shared buffer between the video processing device and the RAID card may be divided according to storage protocols of both parties, and constitutes a virtual-real protocol interaction area for communication between virtual nodes and real nodes of both parties.

The RAID card discovers a physical hard disk through a detection, registers a physical hard disk node according to a storage protocol of the RAID card, and sends a registration request to the video processing device. Correspondingly, the video processing device registers its virtual hard disk node to a upper layer and applies for a virtual-real protocol channel after receiving the registration request, subsequently, data I/O between the virtual hard disk node and the physical hard disk node is achieved through this virtual-real protocol channel.

For example, the video processing device may complete an actual data I/O through the channel and the physical hard disk, present the user with some inherent attributes of the hard disk (manufacturer, DMA mode, etc.), so that the video processing device operates the hard disks as operating locally.

The video processing device may also send hard disk structured information to the RAID card through the virtual hard disk node, the virtual-real protocol channel and the physical hard disk node according to a RAID building command from the business layer; the RAID card may write the hard disk structured information into each physical hard disk after receiving the hard disk structured information via the physical hard disk node.

For example, the video processing device may determine the hard disk structured information according to parameters input by the user. The above hard disk structured information may include: a storage mode of each physical hard disk and the like. The storage mode may indicate a manner employed when storing data into a physical hard disk. For example, the data may be stored into each physical hard disk averagely, or part of the physical hard disks stores monitoring videos, and another part of the physical hard disks stores check data.

The video processing device may further create a virtual RAID node according to the RAID building command from the business layer, sends a RAID construction request to the RAID card, and applies for a virtual-real protocol channel in the virtual-real protocol interaction area; the RAID card may create an entity RAID node according to the RAID construction request after receiving the RAID construction request. Subsequently, RAID data I/O operations may be implemented through the virtual RAID node, the virtual-real protocol channel and the physical RAID node.

The video processing device may further send the business data to the entity RAID node of the RAID card through the virtual RAID node and the virtual-real protocol channel; the RAID card may receive the business data through the entity RAID node, and write the business data into each physical hard disk after performing data splitting and RAID computing on the business data.

In an embodiment of the present application, the video processing device may be connected to the RAID card via the PCIe bus, and virtual hard disk nodes corresponding to respective physical hard disk nodes at the RAID card may be built at the video processing device, so that the video processing device may manage the physical hard disk nodes at the RAID card as managing a local hard disk, while the complex RAID computing is actually achieved through the SoC of the RAID card without occupying resources of CPU of the video processing device, so that a normal operation of businesses of the video processing device can be ensured.

Figure 3:
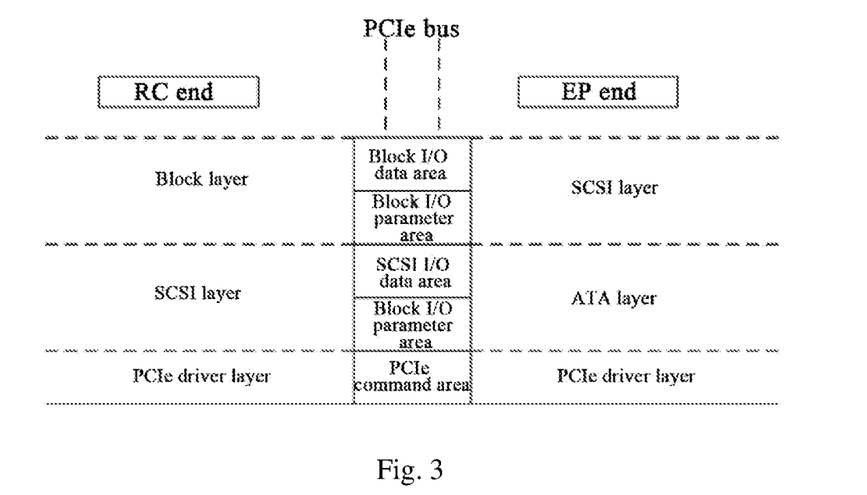
FIG. 3 is a schematic structural view of a shared memory according to an embodiment of the present application.

As an implementation of the embodiment of the present application, as shown in FIG. 3, the virtual-real protocol interaction area of the PCIe bus may include: a Block I/O data area, a Block I/O parameter area, a SCSI I/O data area, a SCSI I/O parameter area and a PCIe command area.

The RC end of the extended storage device may include: a Block layer, a SCSI layer, and a PCIe driver layer, and the EP end may include a SCSI layer, an ATA layer, and a PCIe driver layer. A data protocol stream related to the RAID I/O interacts between the Block layer of the RC end and the SCSI layer of the EP end. A data protocol stream related to the hard disk I/O interacts between the SCSI layer of the RC end and the ATA layer of the EP end, while other commands interact directly through the PCIe driver layer.

Specifically, the Block I/O data area and the Block I/O parameter area of the PCIe bus are communication sharing spaces between the Block layer of the RC end and the SCSI layer of the EP end, which mainly serve the data I/O for a RAID level; the SCSI I/O data area and the SCSI I/O parameter area are communication sharing spaces between the SCSI layer of the RC end and the ATA layer of the EP end, which mainly serve the data I/O for a hard disk level; the PCIe command area is used for a conventional command communication between the RC end and the EP end, wherein the forms of commands are various, and the parameters of the commands are not fixed.

As an implementation of the embodiment of the present application, when the extended storage device is started, it may perform an initialization operation, that is, the RAID card may be started. Specifically, the RC end first starts running, the PCIe bus scans the RAID card on the EP end, then loads a PCIe bus driver of the RC end, and starts the RAID card of the EP end by combining the PCIe bus driver and an APP.

Figure 4:
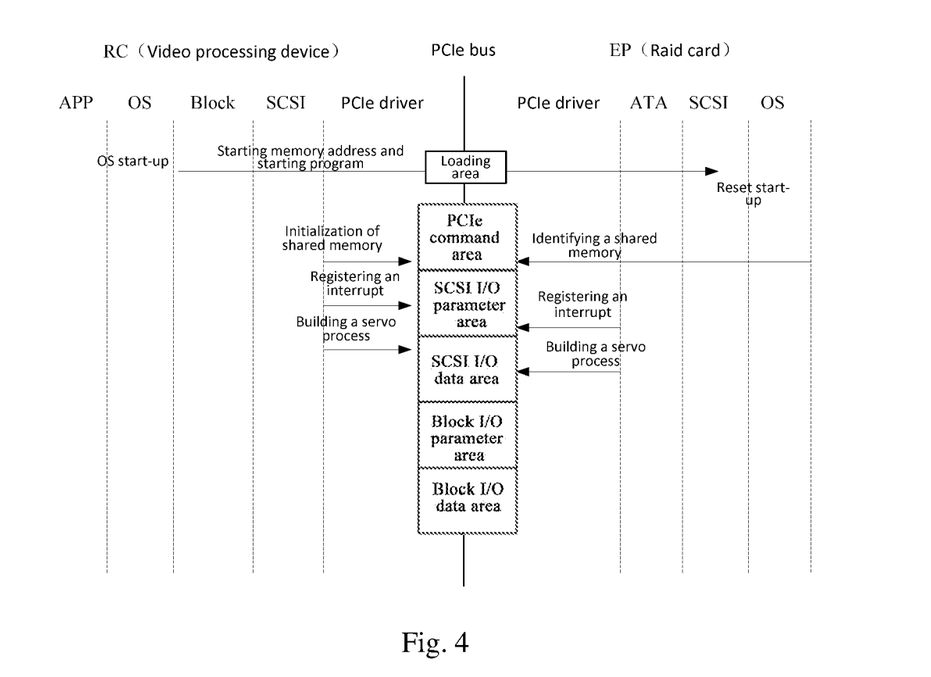
FIG. 4 is flow diagram of initializing an extended storage device according to an embodiment of the present application.

As shown in FIG. 4, FIG. 4 shows a flow diagram of initializing the extended storage device according to an embodiment of the present application. When the operating system of the video processing device is started, the video processing device may scan the RAID card via the PCIe bus, determine a start-up memory address and an address mapping of the RAID card, load an embedded Linux minimum system required for starting the RAID card into the start-up address of the RAID card and reset the RAID card. The RAID card then runs the embedded Linux minimum system after completing a reset, to complete the running of its minimum system.

As shown in FIG. 4, a shared memory of the PCIe bus may further include a loading area. Thereby, the video processing device may write a start-up program (embedded Linux minimum system, uboot, kernel, rootfs) into the loading area; the RAID card may obtain the start-up program from the loading area, run the start-up program and start its operating system.

Furthermore, the video processing device may further initialize the PCIe command area, the SCSI I/O data area, the SCSI I/O parameter area in the shared memory, and register an interrupt and build a servo process; the RAID card may identify the PCIe command area, the SCSI I/O data area, the SCSI I/O parameter area, and register the interrupt and build the servo process to perform information interaction according to the shared memory, the interrupt, and the servo process.

Resources started by the RAID card include Uboot, Kernel and Rootfs. Simple peripheral configuration such as the memory may be achieved through the Uboot, and then jumping to the execution of Kernel and Rootfs. At the same time, the PCIe driver of the video processing device completes the initialization of areas of the shared memory, registers the interrupt and builds the servo process, and then the initialization of the video processing device has been achieved. The Kernel of the RAID card starts to execute, and correspondingly the PCIe driver starts loading, identifying the shared memory area, registering the interrupt, and building the servo process.

After the extended storage device is initialized, it may further perform hard disk management. In the embodiment of the present application, the physical hard disks are all attached to the RAID card, therefore the hard disk management is initiated by the RAID card. The Linux Kernel of the RAID card detects a physical hard disk attached to a SATA controller during a startup process, and then synchronizes with the driver layer and protocol layer of the RAID card and the video processing device.

Figure 5:
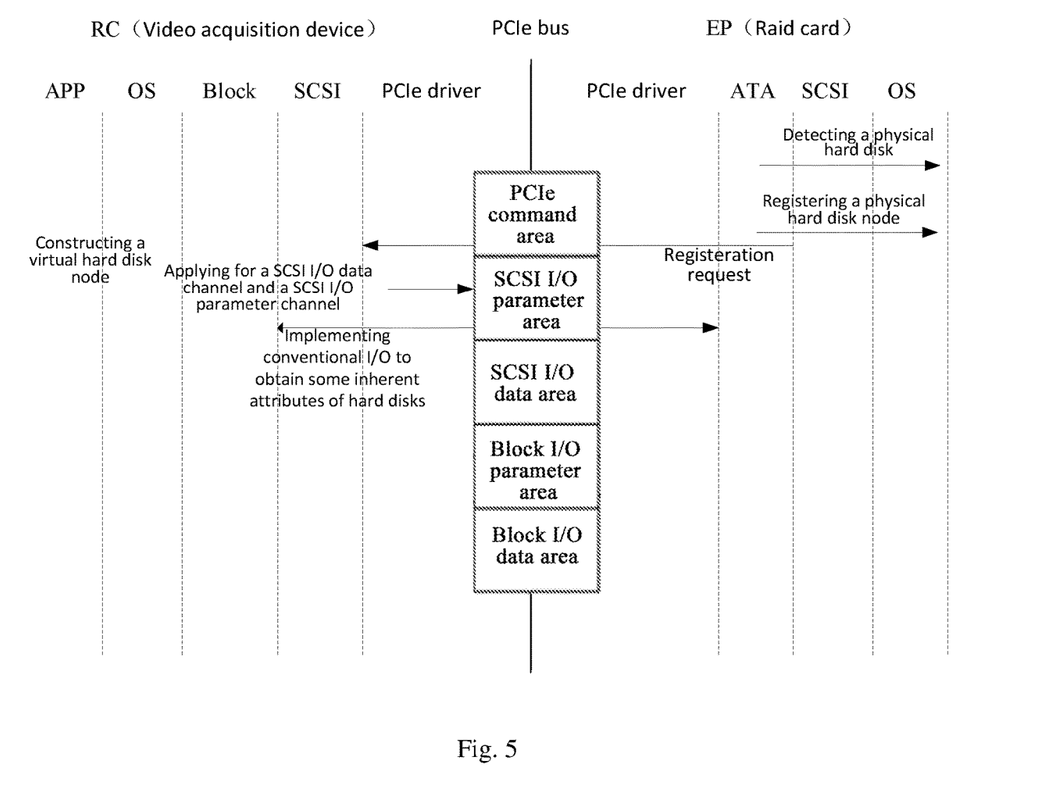
FIG. 5 is a flow diagram of hard disk management according to an embodiment of the present application.

The SATA controller driver of the RAID card starts to initialize, and then a stage of hard disk management is entered. Specifically, as shown in FIG. 5, FIG. 5 shows a flow diagram of hard disk management according to an embodiment of the present application.

The RAID card may initialize its SATA controller after registering an interrupt and building a servo process. The RAID card may register a physical hard disk node according to its storage protocol after detecting a physical hard disk attached thereto, and send a registration request to the video processing device through the PCIe command area, and send an interrupt to notify the video processing device. The video processing device may receive the registration request sent by the RAID card by receiving the interrupt and initiating the servo process, and register a corresponding virtual hard disk node according to the registration request.

Specifically, the RAID card may send the registration request to the video processing device through the PCIe command area, and the video processing device may receive the registration request by receiving the interrupt and initiating the servo process. After registering the virtual hard disk node, the video processing device may further apply for a SCSI I/O data channel and a SCSI I/O parameter channel in the SCSI I/O data area and the SCSI I/O parameter area. With these channels, the video processing device may complete some conventional I/O with the physical hard disk through the virtual hard disk node, the channels, the physical hard disk node, so as to obtain some inherent attributes of hard disks (manufacturer, DMA mode, etc.).

At this time, for the embedded NVR/DVR device at the video processing device, there is a hard disk device node that may be operated by a software layer. A hard disk entity node corresponding to the hard disk device node is at the RAID card, and for the video processing device, it has only a logical virtual hard disk.

Figure 6:
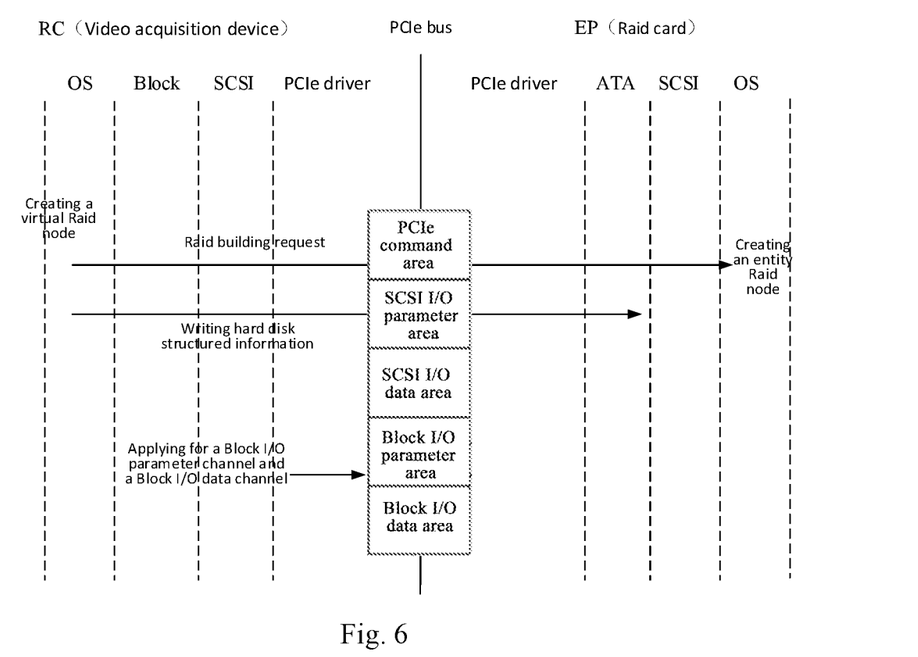
FIG. 6 is a flow diagram of RAID management according to an embodiment of the present application.

After having the virtual hard disk, RAID is also constructed. The RAID management process starts at the embedded NVR/DVR. The APP layer uses a mature soft-RAID management tool "mdadm" to select virtual hard disks that have been created at the RC end to construct a specific RAID mode, even though these hard disks are virtualized by the RC via the PCIe bus, but for the APP layer, they are operated as entity hard disks as for the previous RAID. As shown in FIG. 6, FIG. 6 shows a flow diagram of RAID management according to an embodiment of the present application.

As shown in FIG. 6, the hard disk structured information required by the RAID must be written into each hard disk before creating the RAID, in which the hard disk structured information may be sent to the RAID card through the virtual hard disk node, the physical hard disk node, the SCSI I/O data channel, and the SCSI I/O parameter channel, and then an interrupt is sent to notify the RAID card. The RAID card may receive the hard disk structured information by receiving the interrupt and initiating the servo process, and write the hard disk structured information into each physical hard disk.

As shown in FIG. 6, the video processing device may send a RAID construction request to the RAID card through the PCIe command area after creating the virtual RAID node, and send the interrupt to notify to the RAID card. The RAID card may receive the RAID construction request by receiving the interrupt and initiating the servo process, and create an entity RAID node according to the RAID construction request.

After creating the virtual RAID node, the video processing device may further apply for a Block I/O parameter channel and a Block I/O data channel in the Block I/O data area and the Block I/O parameter area, to perform data I/O through the Block I/O parameter channel and the Block I/O data channel.

As an implementation of the embodiment of the present application, the extended storage device may further perform data storage, for example, the extended storage device may store a monitoring video collected by the video processing device. Specifically, an APP at the video processing device may directly initiate data I/O to the virtual RAID node for actual data storage. The process of the video processing device starts from the virtual RAID node of the Block layer. When the data arrives at the RAID card, a corresponding RAID algorithm is performed by the entity RAID node at the RAID card, and thereby the data is correspondingly written into each physical hard disk.

Figure 7:
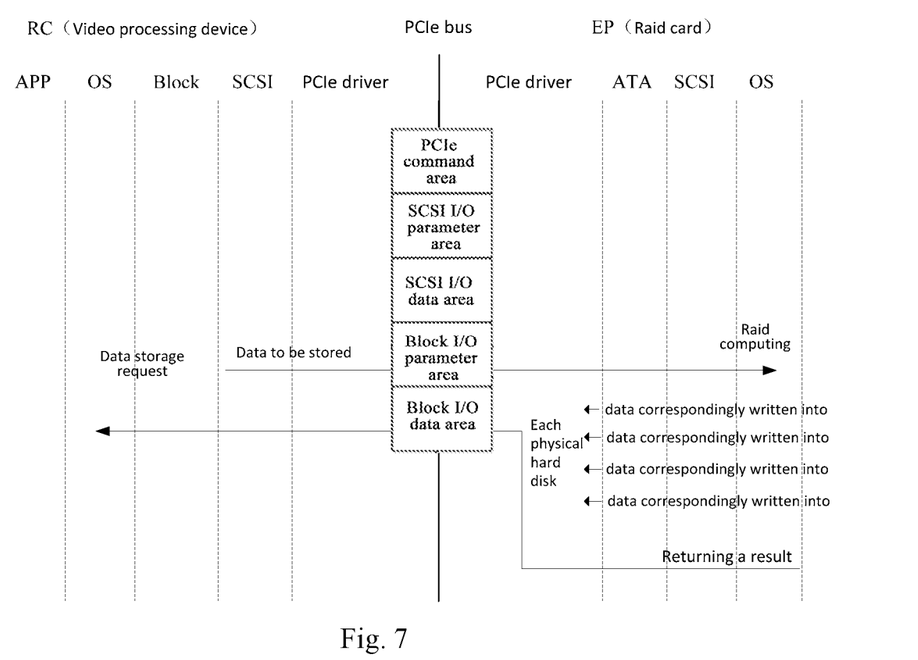
FIG. 7 is a flow diagram of data storage according to an embodiment of the present application.

As shown in FIG. 7, FIG. 7 shows a flow diagram of data storage according to an embodiment of the present application. The video processing device may write data to be stored into the Block I/O parameter channel and Block I/O data channel after receiving a data storage request from the business layer, and send an interrupt to notify the RAID card to obtain the data. After the RAID card receiving a notification message through interrupting its servo process, the RAID card may send the notification message to the entity RAID node.

Then, the entity RAID node enters into the SCSI layer to analyze the business data of the Block I/O parameter channel and the Block I/O data channel, performs the data splitting and the RAID computing, determines data to be stored in each physical hard disk, generates corresponding commands, for example parameters such as the size of the data to be stored in each physical hard disk, and sends each command to the corresponding physical hard disk; and thereby each physical hard disk may respectively process its command and return a SCSI I/O command result. After receiving the SCSI I/O command result sent by each physical hard disk, the RAID card may encapsulate the SCSI I/O command results and sends them to the virtual RAID node of the video processing device to complete data storage.

As an implementation of the embodiment of the present application, the extended storage device may further perform abnormality handling to ensure that the extended storage device is normal, such as handling unidentifiable hard disc, hot standby, efficient reconstruction and so on.

Figure 8:
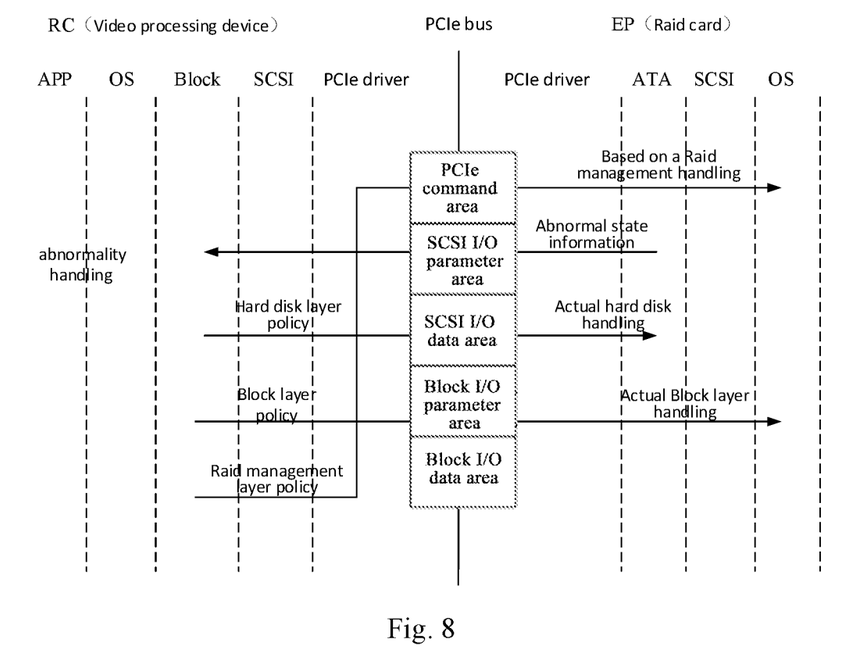
FIG. 8 is a flow diagram of abnormality handling according to an embodiment of the present application.

Specifically, as shown in FIG. 8, FIG. 8 shows a flow diagram of abnormality handling according to an embodiment of the present application. When detecting that a physical hard disk is abnormal, the RAID card may send an abnormal state information to the video processing device. The video processing device may receive the abnormal state information, determine a corresponding abnormality handling policy, and send the abnormality handling policy to the RAID card. The RAID card may then receive the abnormality handling policy and complete handling the abnormality according to the abnormality handling policy.

The RAID card may send the abnormal state information of the hard disk to the video processing device through the SCSI I/O parameter area and the SCSI I/O data area. The video processing device may receive the abnormal state information of the hard disk through interrupting its servo process. Then, a corresponding abnormality handling policy is determined by the APP. The RAID card may further receive the abnormality handling policy through its servo process. The APP may apply prior arts to determine the abnormality handling policy, which are not described in detail in the embodiment of the present application.

In some cases, the abnormality handling policy determined by the video processing device may include different levels of policies, such as a physical hard disk layer policy, a block layer policy, and a RAID management layer policy. In this case, the video processing device may send a policy of each layer to the RAID card by different areas of the shared memory.

For example, as shown in FIG. 8, the video processing device may send the physical hard disk layer policy to the RAID card through the SCSI I/O data area and the SCSI I/O parameter area, and the RAID card performs a processing for the ATA layer and an actual hard disk after receiving a command parameter and data. The video processing device may send the Block layer policy to the RAID card through the Block I/O data area and the Block I/O parameter area, and a corresponding processing related to the Block layer and the SCSI layer may be achieved through the RAID card. The video processing device may send the RAID management layer policy to the RAID card through the PCIe command area, and a processing of the RAID management layer such as hot standby and data reconstruction is achieved through the RAID card.

It should be noted that the relationship terms herein such as "first", "second", and the like are only used for distinguishing one entity or operation from another entity or operation, but do not necessarily require or imply that there is any actual relationship or order between these entities or operations. Moreover, the terms "include", "comprise" or any other variants thereof are intended to cover non-exclusive inclusions, so that processes, methods, articles or devices comprising a series of elements comprise not only those elements listed but also those not specifically listed or the elements intrinsic to these processes, methods, articles, or devices. Without further limitations, elements defined by the sentences "comprise(s) a." or "include(s) a." do not exclude that there are other identical elements in the processes, methods, articles, or devices which include these elements.

All the embodiments are described in corresponding ways, same or similar parts in each of the embodiments can be referred to one another, and the parts emphasized are differences to other embodiments. Especially for embodiments of a device, since they are similar to embodiments of a method, the description thereof is relatively simple; the relating parts could refer to the parts of the description of embodiments of the method.

It will be understood by those of ordinary skills in the art that all or some of the steps in the methods described above may be accomplished by a program to instruct the associated hardware. Said program may be stored in a computer-readable storage medium, such as ROMs/RAMs, magnetic disks, optical disks, etc.

The embodiments described above are merely preferred embodiments of the present application, and not intended to limit the scope of the present application. Any modifications, equivalents, improvements or the like within the spirit and principle of the application should be included in the scope of the application.

What is claimed is:

1. An extended storage device based on a peripheral component interconnect express (PCIe) bus, wherein the device comprises: a video processing device and a Raid card; the video processing device is connected to a redundant array of inexpensive disks (RAID) card via a PCIe bus; the RAID card comprises an embedded system on chip (SoC); the Raid card is attached with multiple physical hard disks;
   a PCIe bus shared buffer between the video processing device and the RAID card is divided according to storage protocols of the video processing device and the RAID card to constitute a virtual-real protocol interaction area for communication between a virtual node and an entity node of the both parties;
   the RAID card is configured for detecting a physical hard disk attached to the RAID card, registering a physical hard disk node according to a storage protocol of the RAID card, and sending a registration request to the video processing device;
   the video processing device is configured for receiving the registration request, registering a corresponding virtual hard disk node according to the registration request, and applying for a virtual-real protocol channel in the virtual-real protocol interaction area;
   the video processing device is further configured for sending hard disk structured information to the RAID card through the virtual hard disk node, the virtual-real protocol channel, and the physical hard disk node according to a RAID building command from a transaction layer;
   the RAID card is further configured for receiving the hard disk structured information through the physical hard disk node and writing the hard disk structured information into each physical hard disk;
   the video processing device is further configured for creating a virtual RAID node according to the RAID building command from the transaction layer and sending a RAID construction request to the RAID card;
   the RAID card is further configured for receiving the RAID construction request and creating an entity RAID node according to the RAID construction request;
   the video processing device is further configured for sending transaction data to the entity RAID node of the RAID card through the virtual RAID node and the virtual-real protocol channel;
   the RAID card is further configured for receiving the transaction data through the entity RAID node and writing the transaction data into each physical hard disk after performing data splitting and RAID computing on the transaction data.

2. The extended storage device of claim 1, wherein, the virtual-real protocol interaction area comprises: a PCIe command area, a SCSI I/O parameter area, a SCSI I/O data area, a Block I/O parameter area, a Block I/O data area; wherein,
   data communication between a virtual hard disk node of the video processing device and a physical hard disk node of the RAID card is achieved through a channel applied for in the SCSI I/O parameter area and the SCSI I/O data area;
   data communication between a virtual RAID node of the video processing device and the entity RAID node of the RAID card is achieved through a channel applied for in the Block I/O parameter area and the Block I/O data area;
   command interaction between the video processing device and the RAID card is achieved through the PCIe command area.

3. The extended storage device of claim 2, wherein,
   the video processing device is further configured for, when its operating system is started, scanning the RAID card via the PCIe bus, determining a start-up address and an address mapping of the RAID card, mapping an embedded Linux minimum system required for starting the RAID card into the start-up address of the RAID card, and resetting the RAID card;
   the RAID card is further configured for running the embedded Linux minimum system after completing the reset;
   the video processing device is further configured for registering an interrupt and building a servo process;
   the RAID card is further configured for registering an interrupt and building a servo process.

4. The extended storage device of claim 3, wherein,
   the RAID card is specifically configured for, after registering the interrupt and building the servo process, initializing a SATA controller of the RAID card, registering a physical hard disk node according to the storage protocol of the RAID card after detecting a physical hard disk attached to the RAID card, sending a registration request to the video processing device through the PCIe command area, and sending the interrupt to notify the video processing device;
   the video processing device is specifically configured for receiving the registration request sent by the RAID card by receiving the interrupt and initiating the servo process, and registering a corresponding virtual hard disk node according to the registration request.

5. The extended storage device of claim 3, wherein,
the video processing device is further configured for applying for a SCSI I/O data channel and a SCSI I/O parameter channel in the SCSI I/O data area and the SCSI I/O parameter area after registering the corresponding virtual hard disk node;
the video processing device is specifically configured for sending the hard disk structured information to the RAID card through the virtual hard disk node, the SCSI I/O data channel and SCSI I/O parameter channel, and the physical hard disk node, and sending the interrupt to notify the RAID card;
the RAID card is specifically configured for receiving the hard disk structured information by receiving the interrupt and initiating the servo process, and writing the hard disk structured information into each physical hard disk.

6. The extended storage device of claim 5, wherein,
the video processing device is specifically configured for sending the RAID construction request to the RAID card through the PCIe command area, and sending the interrupt to notify the RAID card;
the RAID card is specifically configured for receiving the RAID construction request by receiving the interrupt and initiating the servo process, and creating an entity RAID node according to the RAID construction request.

7. The extended storage device of claim 3, wherein,
the video processing device is further configured for applying for a Block I/O parameter channel and a Block I/O data channel in the Block I/O data area and the Block I/O parameter area after creating the virtual RAID node;
the video processing device is specifically configured for receiving a data storage request from the transaction layer, writing transaction data to be stored into the Block I/O parameter channel and Block I/O data channel, and sending the interrupt to notify the RAID card;
the RAID card is specifically configured for receiving the transaction data from the Block I/O parameter channel and the Block I/O data channel by receiving the interrupt and initiating the servo process, performing the data splitting and RAID computing, and writing concurrent data obtained after the computing into each physical hard disk.

8. The extended storage device of claim 7, wherein,
the RAID card is further configured for receiving a SCSI I/O command result sent by each physical hard disk, and sending the SCSI I/O command result to the virtual RAID node of the video processing device.

9. The extended storage device of claim 3, wherein,
the RAID card is further configured for sending abnormal state information to the video processing device when detecting an abnormality of a physical hard disk;
the video processing device is further configured for receiving the abnormal state information, determining a corresponding abnormality handling policy, and sending the abnormality handling policy to the RAID card;
the RAID card is further configured for receiving the abnormality handling policy, and handling the abnormality according to the abnormality handling policy.

10. The extended storage device of claim 9, wherein,
the RAID card is specifically configured for sending the abnormal state information to the video processing device through the SCSI I/O data channel and SCSI I/O parameter channel when detecting the abnormality of the physical hard disk.

11. The extended storage device of claim 10, wherein, the abnormality handling policy comprises: a physical hard disk layer abnormality handling policy, a Block layer abnormality handling policy and a RAID management layer abnormality handling policy;
the video processing device is specifically configured for sending the physical hard disk layer abnormality handling policy to the RAID card through the SCSI I/O data channel and the SCSI I/O parameter channel, sending the Block layer abnormality handling policy to the RAID card through the Block I/O data channel and the Block I/O parameter channel, and sending the RAID management layer abnormality handling policy to the RAID card through the PCIe command area.

12. The extended storage device of claim 11, wherein,
the video processing device is specifically configured for receiving the abnormal state information by receiving the interrupt and initiating the servo process;
the RAID card is specifically configured for receiving the abnormality handling policy by receiving the interrupt and initiating the servo process.

* * * * *